United States Patent [19]

Stange et al.

[11] Patent Number: 5,374,103
[45] Date of Patent: Dec. 20, 1994

[54] SELF-CAPTIVATED LATCH PAWL

[75] Inventors: Richard C. Stange, Oceanside; Konrad E. Nierich, Costa Mesa, both of Calif.

[73] Assignee: Hughes-Avicom International, Inc., Glendora, Calif.

[21] Appl. No.: 54,498

[22] Filed: Apr. 22, 1993

[51] Int. Cl.⁵ .............................................. A47C 7/72
[52] U.S. Cl. .............................. 297/188.16; 248/27.1; 292/194; 297/217; 297/188.18
[58] Field of Search ................... 297/193, 194, 217; 248/27.1; 292/194, 214, 220, 304

[56] References Cited

U.S. PATENT DOCUMENTS

| | | | |
|---|---|---|---|
| 1,380,263 | 5/1921 | Stein | 292/194 |
| 2,527,278 | 10/1950 | Schemansky | 292/194 |
| 3,040,338 | 6/1962 | Zeleny et al. | 248/27.1 |
| 3,090,587 | 5/1963 | Peterson | 248/27.1 |
| 4,416,488 | 11/1983 | Wall | 297/194 X |

*Primary Examiner*—Peter R. Brown
*Attorney, Agent, or Firm*—Georgann S. Grunebach; Terje Gudmestad; W. K. Denson-Low

[57] ABSTRACT

A removable passenger control unit (20) is detachably latched in position in a recess in the arm (12) of a passenger seat by means of a rotatable C-shaped pawl (40) that is mounted on a support arm (54) that projects into a recess (48,50,52) in an end of the passenger control unit. The legs (70,72) of the pawl straddle the support arm, and one leg (72) is threadedly engaged with a cap screw (60) that is rotatable and slidable in an aperture at the end of the support arm. The other leg (70) of the C-shaped pawl (40) has an aperture that receives an enlarged head (62) of the cap screw. The arrangement allows the pawl to be rotated between latched and unlatched positions and to be shifted axially of the cap screw by rotation of the cap screw. The capture of an upper leg (70) of the C-shaped pawl by the enlarged head (62) of the cap screw resists tilting moments exerted by engagement of the pawl with a panel edge (18) of the passenger seat. The pawl is captured by its cap screw (60) and support arm (54) by the threaded engagement of one pawl leg with the cap screw.

10 Claims, 2 Drawing Sheets

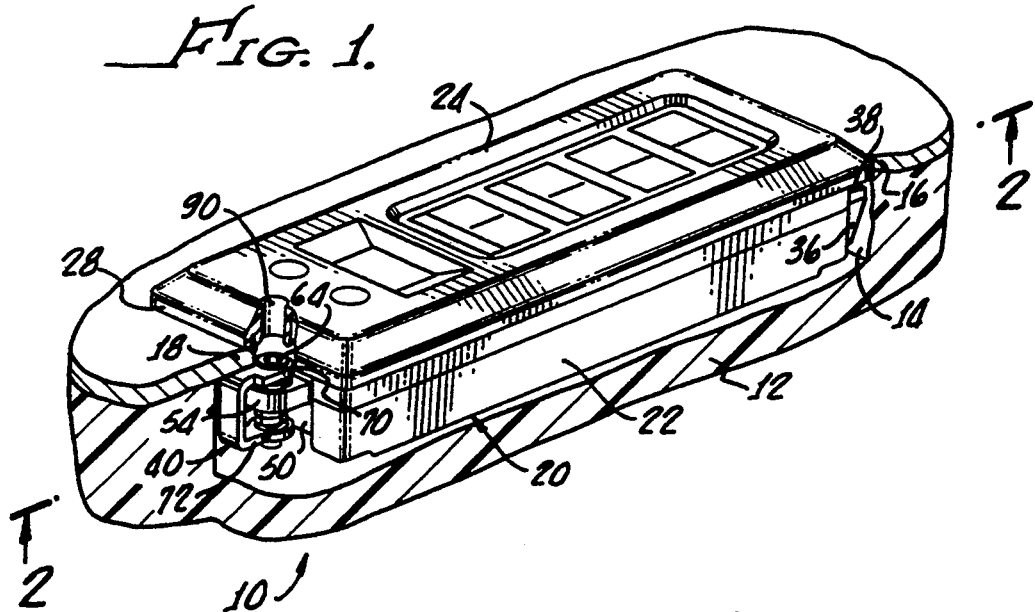
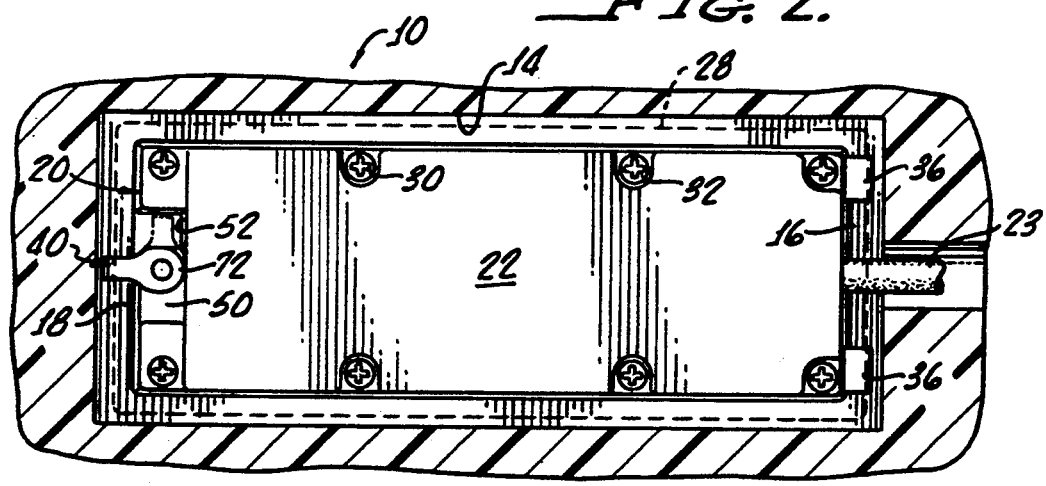
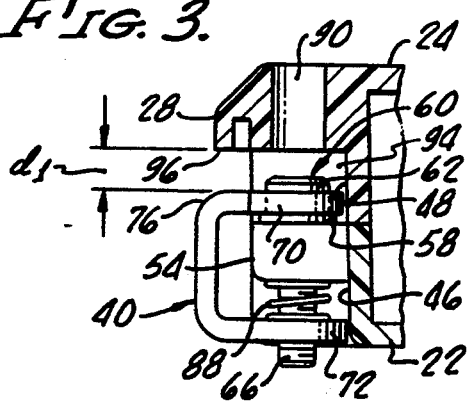
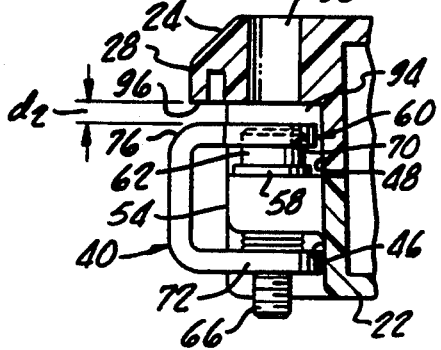

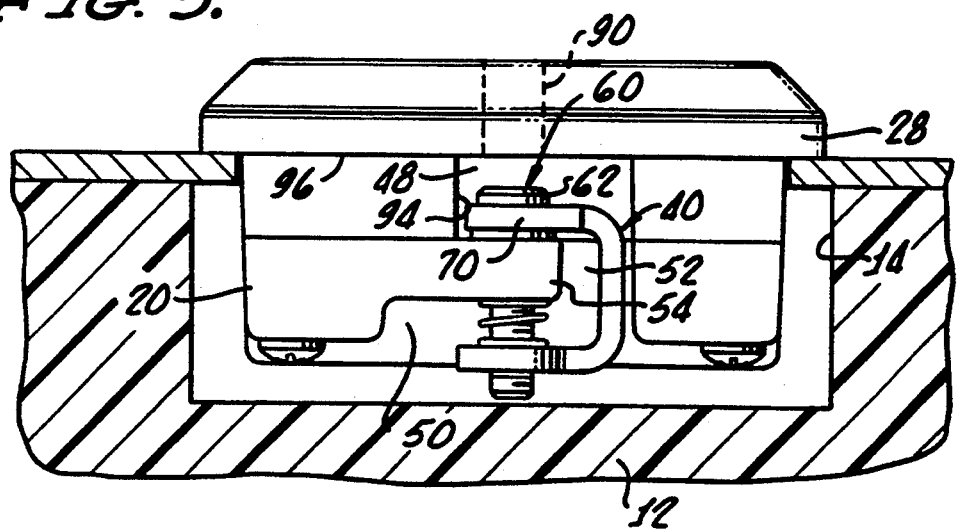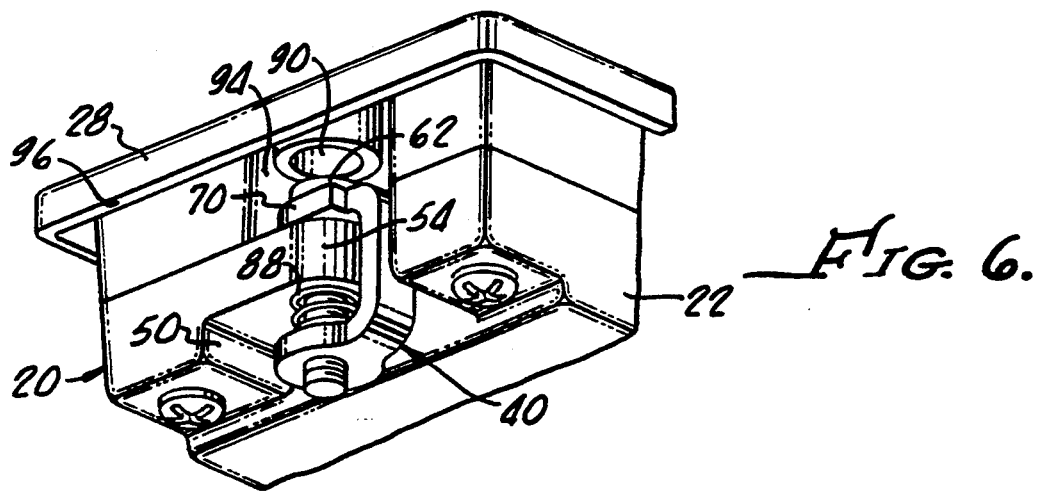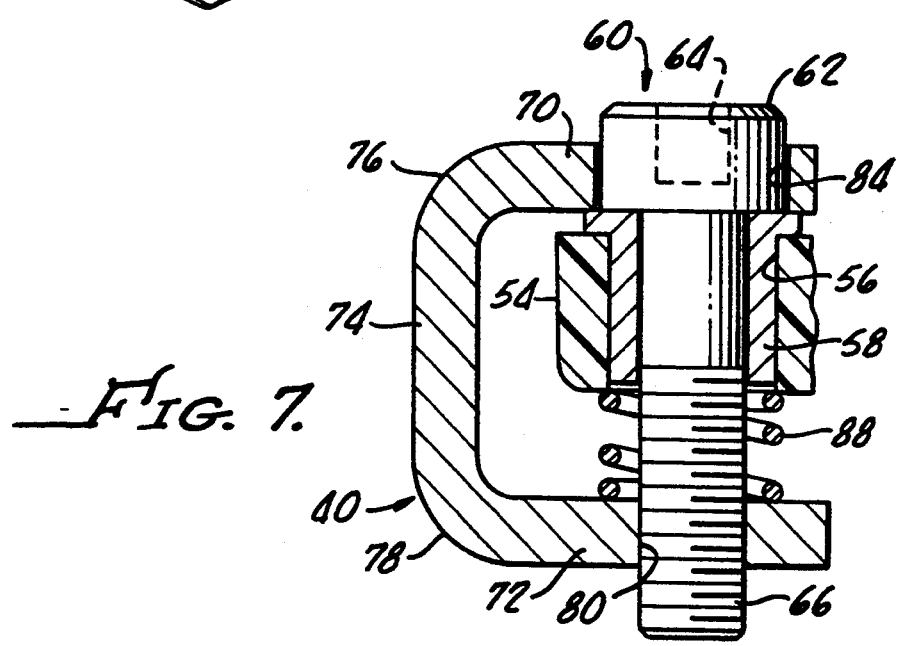

SELF-CAPTIVATED LATCH PAWL

BACKGROUND OF THE INVENTION

1. Field of the Invention

The present invention relates to latching mechanisms, and more particularly concerns a latching pawl that is self-captivating and readily accessible to an operating tool.

2. Description of Related Art

A latch pawl is commonly employed to detachably secure various hardware items, doors and similar movable items to a fixed panel. The movable device that is to be latched is moved to a position closely adjacent an edge of the fixed panel, and a swinging pawl, carried either by the latchable device or the fixed panel, is then swung out from a retracted position to a position in which it engages the other one of the relatively movable parts to restrict or obstruct further motion, or to provide a clamping action. In some latchable units an L-shaped pawl has a horizontal leg that is pivoted on a vertical mounting screw so that its second and vertical leg may be swung from a retracted position to a projected position wherein a free end of the vertical leg engages one edge of a panel against which it may be drawn and tightened by rotation of the mounting screw. However, the configuration of the prior pawls causes them to take pressure on the free end of the swingable vertical leg. This pressure is exerted along a line that is displaced from the axis of the screw and causes tilting moment that tends to tilt the pawl outwardly away from its axis of rotation. This moment also tends to tilt the mounting screw itself. When the mounting screw tilts, access to a driving end of the screw, which adapted to receive a screwdriver for example, may be difficult, since the screw is no longer properly aligned in its intended orientation.

Inadvertent detachability of some prior pawls or their parts is another problem. The rotating threaded screw of some prior pawls is threaded into a nut, which then requires an additional lock nut to retain the nut on the screw. The lock nut has been typically used to keep the pawl from being detached from the screw, making the latch pawl assembly of increasing dimensions and unnecessarily bulky. Furthermore, the lock nut may loosen during loosening of a clamping pawl, and it is easily possible to inadvertently completely unscrew the lock nut and latch pawl from the screw. Where the device being secured by the pawl is a passenger control unit that is detachably secured in the recess of a passenger seat, the lock nut and/or the pawl might easily fall into the recess of the seat, where it becomes inaccessible. This would require procurement of a substitute control unit having its own properly configured latch pawl. This replacement is not only expensive but time consuming because of the time necessary to procure a substitute unit.

Accordingly, it is an object of the present invention to provide a latch pawl system that avoids or minimizes above mentioned problems.

SUMMARY OF THE INVENTION

In carrying out principles of the present invention in accordance with a preferred embodiment thereof, a latching system includes a latchable unit having a pawl support arm. A pawl control pin rotatably extends through an aperture in the support arm and mounts a C-shaped latch pawl having first and second legs interconnected by a bight. The first pawl leg is secured to one end of the pin, and the second end of the pin on the other side of the support arm has an enlarged head that extends through a clearance hole in the other pawl leg. This enables the pawl and pin to rotate on the pawl support arm between a first position wherein the pawl bight is close to the latchable unit and a second position in which the pawl bight projects outwardly from the latchable unit.

According to another feature of the invention the pawl control pin is directly threaded into one of the legs of the C-shaped pawl. Load force exerted upon the pawl during latching engagement is effectively exerted through the bight on both of the pawl legs. Importantly, the second pawl leg, which receives the enlarged head of the control pin, resists tilting forces exerted on the pawl in its latching position and helps to retain the control pin in its predetermined orientation so as to be readily accessible to an operating tool.

BRIEF DESCRIPTION OF THE DRAWINGS

In the accompanying drawings:

FIG. 1 is a fragmentary pictorial view, with parts broken away, illustrating the use of a latch pawl embodying principles of the present invention to connect a passenger control unit to and within a recess in the arm of a passenger seat;

FIG. 2 is a view of the bottom of the passenger control unit, taken on line 2—2 of FIG. 1;

FIG. 3 is a side elevational view showing the pawl rotationally extended and in vertically retracted position;

FIG. 4 is a view similar to FIG. 3 showing the latch pawl in a vertical shifted latching position;

FIG. 5 is a front view of an end of a passenger control unit having the latch pawl of the present invention installed thereon and showing the latch pawl in rotationally retracted position;

FIG. 6 is a pictorial view of an end of a passenger control unit showing the support arm and recess for the latch pawl; and FIG. 7 is a vertical sectional view of the latch pawl.

DESCRIPTION OF THE PREFERRED EMBODIMENTS

Illustrated in FIG. 1 is a portion of a seat arm 10, having a body 12 in which is formed an elongated recess 14. Projecting a small distance into upper ends of the recess at either end thereof are ends of seat arm panel portions 16,18 which form upper structural portions of the seat arm. Addition upholstery material (not shown) is provided to cover the seat arm.

Mounted within the recess 14 of the seat arm for quick removal and installation is an elongated, generally rectangular passenger control unit, indicated at 20. The passenger control unit is formed in two longitudinal sections, including a lower body section 22 housing certain electronics and electrical connections, such as electrical cable 23, and an upper body section 24 that forms an upper section cover having a circumferential outwardly extending flange 28. Upper and lower body sections 22,24 are detachably connected to one another so that the upper section and its cover may be removed for access to the interior of the lower section. The two sections are connected to one another by a series of screws, such as screws 30 and 32.

Fixed to lower body section 22 at one end thereof (the right end as viewed in FIGS. 1 and 2) are a pair of outwardly projecting tongues 36 (FIGS. 1 & 2), having an upper edge 38 (FIG. 1) that is adapted to slide under and engage the under surface of the protruding edge of rigid panel part 16, to capture the edge of panel part 16 between the upper edges of the tongues 36 and the lower surface of peripheral flange 28. Movably mounted to the other end of the lower body section 22 of the passenger control unit 20 is a rotatable or swingable latch pawl 40 of generally C-shaped configuration that is arranged to swing out from a retracted position in a recess 48,50,52 (FIG. 5) in the end of the control unit to a latching position in which it projects under the free end of the edge of panel part 18. The latch pawl is vertically shiftable, and may be drawn tightly upwardly against the under surface of the edge 18 by mechanism more specifically illustrated in FIGS. 2, 4, 5 and 6. This mechanism enables the latch pawl to be moved vertically from a lower position, shown in FIG. 3 toward an upper clamping position, shown in FIG. 4.

The end of the control panel unit on which is mounted the latch pawl 40 includes a recess that is generally in the form of a "C" having a first, upper horizontal recess section 48, a second, lower and somewhat longer horizontal recess section 50, with the two sections interconnected by a generally vertical horizontal recess section 52. Formed integrally with an end portion of lower control unit section 22 is a pawl support arm 54 that projects into the panel control unit recess 48,50,52, effectively separating recess sections 48 and 50 and defining the shape of the recess.

Support arm 54 includes an aperture 56 (FIG. 7) that extends vertically completely through the arm and is lined with a bronze bearing sleeve 58 that is fixedly secured to the support arm aperture by suitable means, such as being a press fit.

A cap screw 60, having an enlarged head 62 and tool receiving aperture 64 for receiving a screw rotating tool, such as a screwdriver or Allen wrench, includes a shank 66, of which at least a lower end section is threaded.

Latch pawl 40 (FIG. 7) is substantially C-shaped, having an upper horizontal leg 70 and a lower horizontal leg 72 integrally connected with one another by a vertically extending bight portion 74. Bight portion 74 is connected to the upper and lower legs 70,72 by rounded bend portions 76,78. Lower leg 72 of the C-shaped pawl includes an internally threaded aperture 80 that threadedly receives the threaded end of the cap screw shank 66.

Upper leg 70 of the latch pawl is formed with a clearance hole 84 that receives, for both rotation and axial sliding, the enlarged head 62 of the cap screw 60. A compression spring 88 encircles the cap screw shank and is captured between the lower end of the support arm 54 and the inner surface of lower leg 72 of the latch pawl. Cover 24 of the panel control unit 20 is formed with a vertical access aperture 90 that is aligned with the cap screw 60 to allow insertion of a rotational tool, such as a screwdriver or Allen wrench, through the panel control unit cover 24. Preferably, aperture 90 has a diameter smaller than the diameter of cap screw head 62 to ensure capture of the cap screw in the end of the control unit, and to prevent loss of the cap screw through the access aperture.

The pawl is assembled to the panel control unit when the two sections of the latter are disengaged from one another, that is, when the cover and upper section 24 of the panel control unit are detached from the lower body section 22. The C-shaped pawl 40 is positioned with its clearance hole 84 and threaded hole 80 in alignment with the support arm sleeve 58, and the cap screw is then inserted downwardly initially through the clearance hole in upper leg 70 of the pawl, thence through the sleeve 58 that lines the support armhole, thence through the compression spring 88 and threaded into the threaded aperture 80 of the lower leg 72 of the pawl. Because the cap screw is threadedly engaged with the aperture of the lower leg of the pawl, the entire arrangement is connected as a unitary assembly with the C-shaped pawl 40 captured by the support arm and cap screw 60. With the pawl 40 assembled as shown in FIG. 7, the upper section of the panel control unit is reattached to the lower section and the pawl is ready for operation.

The pawl is capable of swinging about the vertical axis of the cap screw from a first or retracted position, which is illustrated in FIGS. 5 and 6. In this position the pawl is received within the recess formed in the end of the panel control unit, with the pawl bight being received in the vertical section 52 of the panel control unit recess. By rotation of the cap screw the pawl may be rotated through 90° from the position illustrated in FIGS. 5 and 6 to the position illustrated in FIG. 3, wherein the pawl projects longitudinally outwardly from the end of the panel control unit. A shoulder 94 (FIGS. 3, 4, 5 and 6) that forms an end of upper recess section 48 of the panel control unit provides a motion limiting stop that engages the upper arm 70 of the pawl as the latter is rotated from its retracted position within the panel control unit recess to its operable latching position shown in FIG. 3.

Initially, before being swung out to operable position shown in FIG. 3, the screw 60 is turned in a counterclockwise direction to effectively shift the pawl downwardly relative to the cap screw via the threaded interengagement between the end of the cap screw and the lower pawl leg 72. In this lower position of the pawl there is a relatively large distance $d_1$ (FIG. 3) between the upper side of upper pawl leg 70 and the lower side 96 of the peripheral flange 28. This relatively large distance enables the panel edge 18 to be readily inserted between the flange 28 and the upper pawl leg. For installation of the panel control unit, the right side of the control unit, that is, the side having the fixed tongues 36, is first inserted to capture the edge of panel end portion 16 by tilting the panel control unit. Then the other end of the panel control unit, which carries the rotatable pawl 40, is dropped into place while the pawl is in its retracted position, the position shown in FIGS. 5 and 6. A tool is then inserted through access hole 90 of the panel control unit cap to engage the tool receiving head 64 of the cap screw 60. As the cap screw is turned in a clockwise direction to swing the pawl into latching position, the pawl itself rotates as a unit together with the cap screw because of the frictional engagement between the threads of the cap screw and the threaded aperture of the lower leg of the pawl. This frictional engagement is aided by spring 88. A nylon patch not shown that is on the threads of the cap screw when purchased, aids this frictional engagement. However, the pawl can only rotate through approximately 90°, at which time it hits the limit stop 94, and further rotation of the pawl is prevented. Now the pawl may be raised to press it against the lower surface of the panel edge 18 by further or continued clockwise rotation of the cap screw. This continued clockwise rotation of the cap screw (while further rotation of the pawl is prevented) effectively lifts the pawl along the cap screw because the lower end of the enlarged head 62 of the cap screw bears against the upper side of the support arm 54.

As the cap screw continues to rotate, its lower threaded end penetrates further through the lower leg 72 of the pawl, but since the head of the cap screw is resting upon the upper flange of the sleeve 58, the pawl is forcibly raised. As the pawl is lifted by the rotation of the screw its upper leg 70, at or adjacent the bend 76, presses against the lower surface of the end of panel 18 that is captured and now clamped between the upper pawl leg 70 and the lower surface 96 of the peripheral panel control unit flange 28, as shown in FIG. 1. Thus the panel control unit is clamped to the end of panel 18 by rotating the cap screw to force the pawl upwardly against the panel edge.

FIG. 4 illustrates the raised position of the pawl (without the panel edge interposed) to illustrate the fact that the peripheral flange 28 of the panel control unit is separated from the upper leg 70 of the pawl by a much smaller distance, indicated at $d_2$, at an uppermost limit of vertical motion of the pawl relative to the support arm 54.

As the pawl is raised by rotation of the cap screw to press against the lower surface of panel end 18, a strong downwardly directed force is exerted upon the upper leg 70 of the pawl very close to the bend 76. This downwardly directed force is substantially parallel to the axis of the cap screw but is displaced laterally from this axis by a significant distance. Therefore, this force creates a moment that tends to tilt the pawl and the cap screw (in a counterclockwise direction as viewed in FIG. 4) about an axis perpendicular to the plane of the paper and also perpendicular to the axis of the cap screw. Such tilting is substantially prevented with the illustrated arrangement because the upper leg 70 of the pawl includes a clearance hole which closely circumscribes the enlarged head 62 of the cap screw. Any tendency of this upper leg to move outwardly (toward the left as seen in FIG. 4) is restrained by the engagement of the pawl clearance hole with the enlarged cap screw head. Because the cap screw passes through both upper and lower legs of the pawl, any tilting of either the pawl or the cap screw must occur as a unit. Both the cap screw and pawl tend to tilt together. However, such tilting would require a tilting of the upper leg 70 of the pawl, which could only take place by moving a portion of the upper leg upwardly, because the upper leg would tend to tilt in a counterclockwise direction, as viewed in FIG. 4. Such upward motion of parts of upper leg 70 is restrained by the engagement of the upper leg with the innermost edge of the seat arm panel 18, in an action that only tends to further tighten the clamping action of the pawl on the panel end. The tilting is also restrained by abutment of an end of lower leg 72 of the panel with surface 46. With pawl tilting restrained, there is likewise an equal restraint on any possible tilting of the cap screw, which accordingly remains aligned with the access hole 90 so that clear unobstructed access of a screwdriver or Allen wrench to the cap screw head is retained.

The C-shaped configuration of the pawl gives the pawl greater strength since the clamping force on the panel edge is effectively exerted as a direct compression force aligned with the pawl bight. This is so because of the restriction on pawl tilt. If the pawl were allowed to tilt, a clamping force might tend to excessively strain the bend at which the lower leg of the pawl is connected to its vertical section. Clamping force on this C-shaped pawl is taken not only as direct compressive force on the pawl bight, but is distributed through two bends, that is, the bend 76 and the bend 78, at which the bight portion of the pawl is connected to its upper and lower legs.

Because of the simple but secure and captivated configuration wherein the cap screw is threaded directly into the lower leg of the pawl, no additional nut or lock nut is required. Therefore, there is little likelihood, if any, that, in vertically retracting the pawl, that is, moving it from the position of FIG. 4 to the position of FIG. 3, the cap screw will be completely removed from the pawl so that the possibility of inadvertently detaching parts of the pawl assembly is greatly minimized or eliminated.

Spring 88, being compressed between the support arm and the lower leg of the pawl, tends to continuously urge the pawl downwardly, as viewed in FIGS. 3, 4 and 7, relative to the support arm 54 and to concomitantly urge the cap screw downwardly to press its enlarged head against the upper side of support arm 54. This resilient spring action tends to hold the parts firmly together to minimize the relative motion of the assemblage of pawl parts and to hold the pawl and cap screw in a repeatable and consistent predetermined position. For example, in the rotationally extended but unclamped position of FIG. 3 the spring ensures that the pawl, and particularly its upper leg 70, will be in a lowermost position so as to provide the maximum clear space $d_1$ for reception of the edge of the seat arm panel. Without the presence of spring 88 the pawl and cap screw might possibly move to an upper position, such as that shown in FIG. 4, prior to insertion of the panel edge 18, making insertion of the panel edge more difficult. Spring 88 ensures that the distance $d_1$ will be as large possible to facilitate insertion of the panel edge 18.

In a particular example the tightening range of this pawl, that is, the range of vertical motion from the position of FIG. 3 to the position of FIG. 4, may be in the order of 0.66 inches. That is, the distance $d_1$ is about 0.131 inches, whereas the distance $d_2$ is about 0.65 inches. This available distance of travel enables accommodation of a range of variation of thicknesses of the seat panel edge 18.

To remove the panel control unit the cap screw is rotated in a counterclockwise direction. After a few turns in a counterclockwise direction, the clamping pressure between the latch pawl and the panel edge is relieved, and the latch pawl will then rotate together with the screw, because of the frictional interengagement of the threads of the cap screw and the threads on the internally threaded lower leg of the pawl. However, the latch pawl can only rotate through 90° back into its recess where it engages the inner wall of the recess, which provides a stop to limit this retracting rotational motion. However, the cap screw continues to be rotated in a counterclockwise direction, thereby moving the latch pawl downwardly relative to the cap screw, which downward relative motion is aided and urged by the compression spring 88 that tends to move the pawl downwardly relatively to the support arm 54. Thus the pawl is downwardly retracted by continued rotation of the cap screw to the point where the pawl rotates together with the screw. When the pawl is returned to its recess the panel edge of the seat recess is released, so that the panel control unit may be withdrawn by first raising the end on which the movable latch pawl is mounted and then withdrawing the other end of the panel control unit.

What is claimed is:

1. A latching system comprising:
   a latchable unit,
   a pawl support arm on said unit and having an aperture extending through the arm from a first side thereof to a second side thereof,
   a pawl control pin rotatably mounted in said aperture, having a first end projecting from said first side of said aperture and having a second end projecting from said second side of said aperture,
   a C-shaped latch pawl having first and second legs interconnected by a bight, and
   means for securing said first pawl leg to said first end of said pin, said second pawl leg having a clearance hole, said second end of said pin received in said clearance hole, said pawl and pin being rotatable on said pawl support arm between a first position wherein said pawl bight is close to said latchable unit and a second position in which said pawl bight projects outwardly from said latchable unit.

2. The latching system of claim 1 wherein said means for securing said first pawl leg comprises interengaging threads on said first pawl end and said first end of said pin.

3. The latching system of claim 1 wherein said first pawl end has an internally threaded aperture, and wherein said means for securing said first end comprises threads on said first control pin end engaging said internally threaded aperture.

4. The latching system of claim 3 wherein said internally threaded aperture is frictionally engaged with the threads on said first pawl end, whereby rotation of said control pin will rotate said pawl, and stop means on said latchable unit for limiting rotation of said pawl, whereby said pawl is rotated by rotation of said control pin until the pawl engages said stop means, and said control pin will shift axially of said pawl upon rotation of said control pin after said pawl engages said stop means.

5. The latching system of claim 1 including spring means on said first end of said pin interposed between said first pawl leg and said arm for urging said pawl and pin in one direction relative to said arm.

6. The latching system of claim 5 wherein said second end of said control pin has an enlarged head that bears against said arm, and wherein said spring means urges said enlarged head against said arm.

7. The latching system of claim 6 wherein said latchable unit comprises a passenger control unit adapted to be detachably secured to a passenger seat, and including a passenger seat arm having a passenger control unit receiving recess, a panel fixed to said seat arm and having an edge extending into said control unit receiving recess, said second pawl leg in said first position being disengaged from said panel edge, and said second pawl leg in said second position being engaged with said panel edge to latch said passenger control unit to said seat arm.

8. In combination with a passenger control unit adapted to be positioned within a recess of a passenger seat arm, said passenger seat arm having a panel edge protruding into the recess, and wherein the passenger control unit includes an outwardly projecting clamping flange adapted to overlay an edge of a projecting panel and to be clamped against the panel edge, an improved latch pawls assembly, said latch pawl assembly comprising:
   a control unit recess formed in an end of said passenger control unit,
   a support arm projecting into said control unit recess,
   said support arm being formed with a hole extending therethrough,
   a C-shaped pawl comprising:
      an upper leg having a clearance hole formed therein,
      a lower leg having a threaded hole formed therein, and
      a bight section fixedly interconnecting said upper and lower legs, said clearance hole and threaded hole being aligned with each other and with the aperture formed in said support arm,
   a threaded member extending through said support arm aperture and having a threaded end in threaded engagement with the threaded hole of said pawl lower leg, said threaded member having an enlarged head that is rotationally and axially slidably received in said clearance aperture, whereby said pawl is rotatable with said threaded member from a retracted position in which said pawl bight is positioned within said passenger control unit recess and a latching position in which said pawl bight and said pawl legs project from said passenger control unit recess for engagement with said seat arm panel edge, said pawl being axially shiftable along said threaded member and relative to said support arm by rotation of said threaded member relative to said lower leg of said pawl to urge said pawl upwardly against the edge of said seat arm panel, said threaded member enlarged head having a lower end bearing against said support arm.

9. The combination of claim 8 including stop means in said control unit recess for providing rotation of said pawl beyond said latching position.

10. The combination of claim 9 including a compression spring on said threaded member between said pawl lower leg and said support arm.

* * * * *